US006892228B1

(12) United States Patent
Penders (10) Patent No.: US 6,892,228 B1
(45) Date of Patent: May 10, 2005

(54) SYSTEM AND METHOD FOR ON-LINE SERVICE CREATION

(75) Inventor: Alain Penders, Diepenbeek (BE)

(73) Assignee: Pure Matrix, Inc., Fort Collin, CO (US)

( * ) Notice: Subject to any disclaimer, the term of this patent is extended or adjusted under 35 U.S.C. 154(b) by 320 days.

(21) Appl. No.: 09/643,749

(22) Filed: Aug. 23, 2000

(51) Int. Cl.⁷ .............................................. G06F 15/16
(52) U.S. Cl. ..................... 709/219; 709/203; 709/220; 709/246; 717/109; 717/107
(58) Field of Search ................................ 709/219, 220, 709/246; 717/107

(56) References Cited

U.S. PATENT DOCUMENTS

| 5,907,607 | A |   | 5/1999 | Waters et al. | 379/207 |
| 5,966,535 | A |   | 10/1999 | Benedikt et al. | 395/707 |
| 6,102,965 | A | * | 8/2000 | Dye et al. | 717/109 |
| 6,173,266 | B1 |   | 1/2001 | Marx et al. | 704/270 |
| 6,189,138 | B1 | * | 2/2001 | Fowlow et al. | 717/107 |
| 6,230,318 | B1 | * | 5/2001 | Halstead et al. | 717/108 |
| 6,272,213 | B1 |   | 8/2001 | Nightingale | 379/201 |
| 6,331,864 | B1 | * | 12/2001 | Coco et al. | 345/763 |
| 6,338,088 | B1 |   | 1/2002 | Waters et al. | 709/226 |
| 2002/0026630 | A1 |   | 2/2002 | Schmidt et al. | 717/103 |

FOREIGN PATENT DOCUMENTS

| GB | 2 335 327 | 9/1999 |
| WO | WO 02/17105 | 2/2002 |

\* cited by examiner

*Primary Examiner*—Glenton B. Burgers
*Assistant Examiner*—Kevin Parton
(74) *Attorney, Agent, or Firm*—Morrison & Foerster, LLP (57) ABSTRACT

A system and method for on-line service creation in which end-users of a device using a platform owned by a platform owner may create a service for the device by configuring and linking pre-defined building blocks which function as the logical steps of the service. The system includes integrity checking mechanisms, and, hence, a platform owner does dot need to be involved in the service creation, activation, or execution processes. The system also allows users to modify, copy, and otherwise manipulate services created by other system users, including, for example, platform owners.

20 Claims, 10 Drawing Sheets

SYSTEM AND METHOD FOR ON-LINE SERVICE CREATION

FIELD OF THE INVENTION

The present invention relates generally to platforms for providing services to devices, and more particularly, to a platform which allows a user of a service for a device to create, activate, and execute the service.

BACKGROUND OF THE INVENTION

As used herein, the term "service" generally refers to an application which performs a function for a device using a platform. A service may include, for example, displaying specified data, or sending data to a device. International Telecommunications Union (ITU) specification 1.312 describes the service creation process in an intelligent network as including several steps: (1) designing the service; (2) developing, implementing, and documenting the service; (3) rigorously testing the service; and (4) activating and using the service. This service creation process is typically performed-offline. It is also complex and time consuming. The Telecommunications Information Networking Architecture (TINA) describes a similar service creation process. For additional details on the TINA service creation process, see "Overall concepts and principles of TINA", version 1.0, issued $17^{th}$ Feb. 1995, or "TINA-C Glossary of Terms", version 2.0 (January 1997), both of which are herein incorporated by reference.

Services are generally created by owners of the platform on which a device receiving the service operates, rather than by the user of the service. For example, a telephone carrier may provide a service enabling customers to define calling groups. While the customer, i.e., the user of the service, can define who is part of a calling group, or configure the service, the customer is not permitted to define the service enabling this access, i.e., the customer is not permitted to define the calling group service itself. Rather, the long distance carrier, or the mobile telephone service provider, i.e., the platform owner, creates the service. Similarly, if an investor desires to sell a security when it reaches a specific price, the investor communicates the desired service request to a broker who may then implement a service to automatically initiate a sale transaction when the security reaches the specified price. The beneficiary of the service, the investor, is not the service creator.

Thus, an end-user of a service is generally provided only with service configuration capabilities, as distinguished from service creation capabilities. Service configuration includes specifying values for a pre-defined service and unlike conventional service creation processes, may be performed on-line. For example, Internet portals, such as Pointcast™, or Yahoo!™ allow Internet users to configure the services they subscribe to. If a Pointcast™ user subscribes to a service to automatically send daily news and securities pricing information, the user may configure the service by indicating which news subject areas and securities should be included in the daily delivery. Similarly, the mobile Internet portal of Yahoo!™ (mobile.yahoo.com) allows users to subscribe to services for receiving e-mail, news, financial information, etc. on a mobile device, such as a mobile phone or a personal digital assistant (PDA) device. A user may configure the service by indicating which information to receive.

Because conventional service creation processes are complex and time-consuming, they do not support rapid creation of new, and customized services. Customized services, or services tailored to the desires of an end-user of the service, are undoubtedly more appealing to end-users because they will be tailored to meet the needs of the user. Most end-users do not have the knowledge or time required to design, develop, test, and implement services. Further, most end-users do not have the necessary platform accesses to introduce a service onto a platform.

Accordingly, a need exists for a manner of allowing an end-user of a device to create a service for the device without intervention from the platform owner.

SUMMARY OF THE INVENTION

The present invention provides an on-line platform which allows an end user of a device using a platform to create a generic application for delivering a service to the device. Services may also be created by, for example, content providers and content aggregators, without intervention of a platform owner. For example, a system user may create a service to automatically issue a selling order for a stock if its price reaches a certain level. The user need not contact the platform owner to create such service. Thus, an owner of a device, i.e., the end-user of a service, can create a service for the device as and when it is needed. An end-user may also modify a previously created, or pre-defined service. The invention provides these service creation capabilities for various network devices that may have either wired or wireless connectivity to the platform. Wired connectivity includes connections through networks like the Internet, as well as telephony. Wireless connectivity includes one-way or two-way wireless voice and data networks. An indirect network connection refers to a connection which is provided, at least in part, by a one- or two-way wireless voice or data network. The system guides each user through the process of creating services.

In accordance with an embodiment of the invention, a system is provided for an end-user of a service for a device using a platform owned by a platform owner to create the service. The system receives from the end-user linking information indicating a second building block to link to a first pre-defined building block. The system then creates a service based on the received linking information.

In accordance with an aspect of the invention, the system may further receive configuration information to configure the first and second pre-defined building blocks.

In accordance with another embodiment of the invention, a method is provided for an end-user of a service for a device using a platform owned by a platform owner to create the service. The end-user of the device sends to a server information to link a first, pre-defined building block to a second pre-defined building block. The service is created based on the received linking information.

In accordance with an aspect of the invention, the end-user may send to the server information to configure the first and second pre-defined building blocks.

In accordance with a further embodiment of the invention, a system is provided for an end-user of a service for a device using a platform owned by a platform owner to create the service. The system includes a server including a platform which includes a service creation interface to allow the end-user to create the service by linking a first pre-defined building block to a second pre-defined building block, and a client including an interface for interacting with the platform. The system may further allow the end-user to configure the first and second pre-defined building blocks.

The platform stores the services created by system users, and may also provide other pre-defined services, supporting even more rapid service creation. Pre-defined services may be viewed and copied by system users, depending on the access rights assigned to the service and to a particular user. Therefore, system users do not have to create their own services, but may instead use services created by other system users, or other pre-defined services. By subscribing to pre-defined services, users may additionally learn more about the platform and the types of services that can be created with it. The system also provides users with access to the building block-level view of the pre-defined services, allowing the users to gain additional insight into the system to understand how it works and how it may be used to create a service.

In accordance with an aspect of the invention, a copy of a pre-defined service, or part thereof, may be provided to a user either upon request, or automatically upon subscription to the pre-defined service. In the latter case, the user subscribes to a personal copy of the pre-defined service. This copy may be used as a foundation for a separate customized service, e.g., the user can modify the service by changing the linking between the building blocks, by changing the configuration of the building blocks, or by adding or deleting building blocks from the service.

In accordance with another aspect of the invention, a service creation interface includes a front-end and may further include an intelligent skin which is accessible through the front-end.

These and other aspects of the invention will become readily apparent to those of ordinary skill in the art from the following description of the invention which is to be read in conjunction with the accompanying drawings and appended claims.

DETAILED DESCRIPTION OF THE INVENTION

The present invention provides a system and method that allows an end-user of a service to create an application which delivers the service to one or more end-users. Throughout this document, "applications" may be referred to as "services." The system and method provides a user-friendly manner for end-users who do not have programming skills or service creation experience to create new services on-line. Services which are created on this platform may also be activated, and executed on-line. The term "device," as used herein, refers to any mechanism which may be accessed through a network, either directly or indirectly, including, for example, cellular phones, handheld computers, and Internet appliances. The term "Internet appliance" refers to a task or function specific device which includes an embedded computer and may be connected to a network such as the Internet. Internet appliances may include, for example, Internet-enabled refrigerators, ovens, VCR's, screenphones, and video cameras. The system and method may also be used to activate, execute, modify, and delete services for devices.

Figure 1:
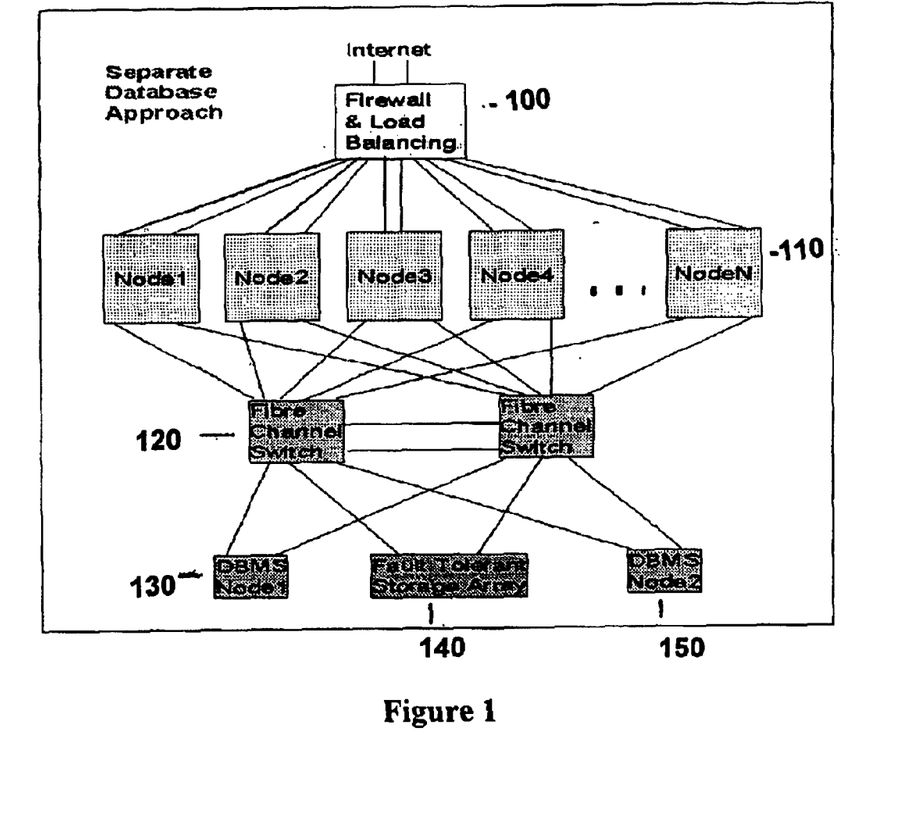
FIG. 1 depicts an exemplary architecture on which the invention could operate.

FIG. 1 depicts an exemplary architecture on which a platform that allows a system user to create, activate, execute, modify, and delete services, could operate. Access to both the Internet and the platform owner's network (e.g., the mobile telephony network) occurs through a redundant firewall & load balancing system. Such a system can be implemented using equipment available from, for example, Cisco™. The load balancing system ensures that all incoming HTTP requests are sent to an active node. Each node includes the software of the invention. A node may be, for example, a Sun™ server running the Solaris operating system.

The connection from the firewall and load balancing system to the Internet, or a platform owner's network, can be implemented with a variety of technologies, such as, leased lines, ethernet connections, or a synchronous transfer node (ATM). The connection from the firewall and load balancing system to the individual nodes occurs through redundant ethernet connections, which may be, for example, 100 mbit or 1 Gbit ethernet. The nodes are connected to redundant fiber optic cables. The fiber channel switches are connected to a fault tolerant storage array and database nodes. Through the fiber channel switches, the nodes can reach each database node and the storage array.

A database node may include one or more machines (e.g., Sun™ servers running the Solaris™ operating system) running a commercially available database server, such as Oracle. The invention software utilizes an abstraction layer which is independent of the software and configuration of the database nodes. The fault-tolerant storage array can range from a series of SCSI disk arrays with RAID 5 (fault tolerance) support to a large Storage Area Network (SAN) system, sold by, for example, EMC2. One of skill in the art will thus appreciate that a variety of storage solutions may be used.

Figure 2:
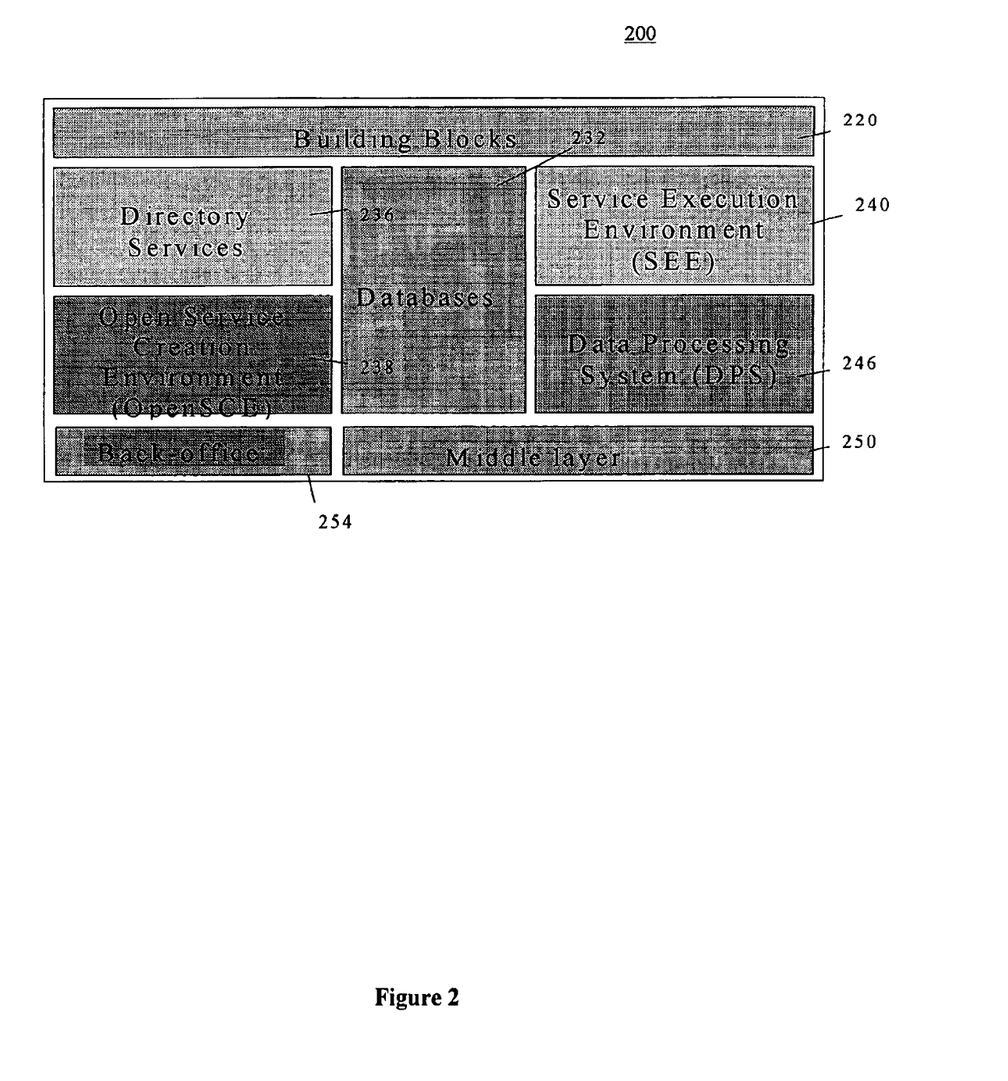
FIG. 2 depicts a logical view of the invention.

FIG. 2 depicts a logical view of the components of a platform 200 which allows a system user to create, activate, execute, modify, and delete services. A service is created by linking and configuring, as appropriate, one or more pre-defined building blocks 220. A building block provides a logical and functional step of a service. Each building block 220 includes a software program including a set of rules indicating the building block's implementation, permissions, and otherwise controlling the operation of the building block. Each building block implements a specific function that can be used to create a service. Building blocks may also include variables to which a user assigns a value. Each building block includes a configuration interface which allows a service creator to configure the building block and indicate which other building blocks, or types of building blocks, the building block may be linked to. The configuration interface guides a user through the process of configuring a building block 220 by presenting to the user step-by-step configuration inquiries until the building block 220 is completely configured. The configuration interface may further simplify the service creation process by, for example, indicating to which building blocks a particular building block can be linked. This indication may be in the form of for example, a hyperlink which, if clicked on, links the building block to another building block, and immediately connects the end-user to the configuration interface of the linked building block. Building blocks that only have optional parameters, or which do not have any parameters, do not require configuration.

Figure 3:
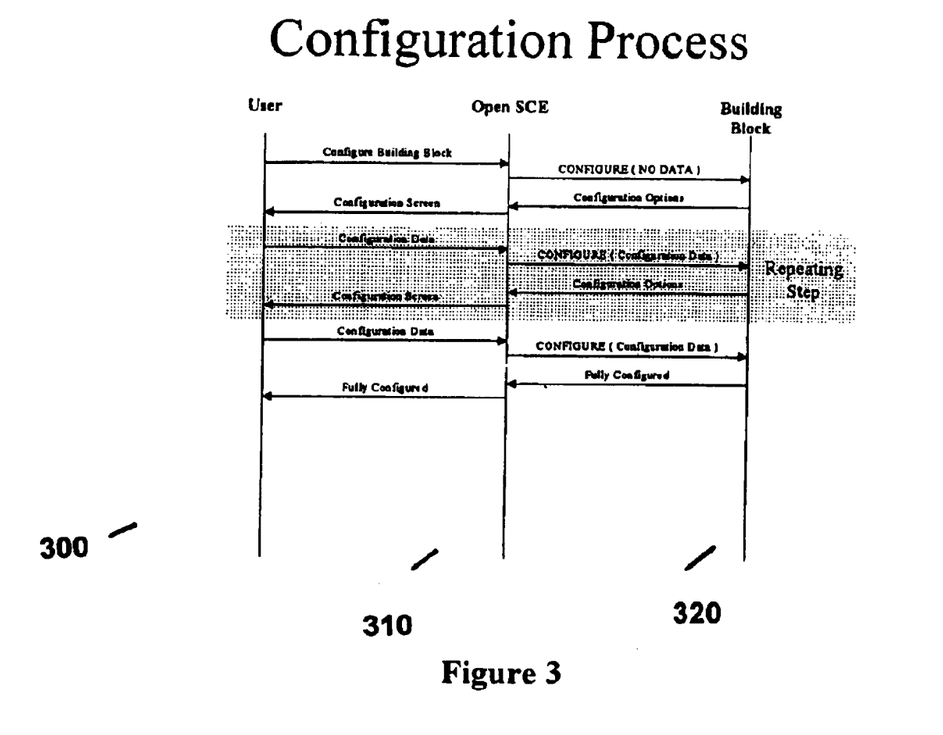
FIG. 3 depicts a flow diagram of the processing that occurs during configuration of a building block, and creation of a service, respectively.

FIG. 3A depicts the processing that occurs during configuration of a building block 220. During the configuration process, each building block is capable of providing information indicating the building blocks to which it can be linked. The user can select one of these specified building blocks to perform instant linking of that building block to the building block being configured. Once that selection is made, the configuration information of the current building block is saved, the new building block is linked and the configuration dialog of the new building block is opened for the user to configure the new building block. When a service creator uses this functionality of the building block configuration interface to select a building block to link to, the building block returns a code from its configuration interface indicating which building block or building block types it should be linked to. Upon receipt of this specific return code, the platform 200 directs the user to perform the linking. Each building block is graphically represented on the screen. The service creator can link building blocks by selecting an existing building block, and subsequently selecting a building block to link to it. After this selection has been made, the service creation environment displays both building blocks as linked. The system confirms that the linking is proper by checking the type and linking restrictions of each building block being linked. Building blocks can be classified in three types: start, stop, and others. Start blocks cannot be linked behind another block; No blocks can be linked behind a stop block. Other blocks must be linked behind a start or other block. Linking restrictions can include such things as not being allowed to link two input blocks, and not being allowed to link a loop block (e.g., for, while, etc.) to itself. Once the new building block has been linked (or is accepted as a start block), the system can begin the building block configuration process for the building block. During the linking and configuration processes, no information is exchanged between the building blocks. The information regarding the linking and configuration of the building blocks for a service being created, i.e., building block configuration data, is managed and stored by the OpenSCE.

FIG. 3B depicts further details of how a service is created by configuring building blocks. Once all of the building blocks of a service have been configured, the service creation process is complete and the service is added to the service directory.

Building blocks are developed by a third party, for example, PureMatrix™, and are installed by the owner of the platform on which they operate. Before being made available to the platform, building blocks are rigorously tested to decrease their likelihood of negatively impacting the integrity of the platform or an associated service, including, for example, the platform crashing, and data corruption. During testing, various usage patterns of the building block are analyzed to ensure that the building block functions as intended.

This testing represents one of the many levels of integrity checking which is built into the platform. The Open Service Creation Environment 228 (OpenSCE) provides a graphical user interface to create services on the platform 200. Via OpenSCE 228, a user may select, link, and configure building blocks into a functional service. Once a service has been created using the OpenSCE, it is stored in databases 232. The databases 232 also store user information, including, for example, logging and statistical data, and session data. The OpenSCE 228 is only available from HTML-enabled devices including, for example, PCs and WebTVs.

Directory services 236 displays to a user the services which may be used by that user. It includes services which were created by system users, and pre-defined applications, such as a service created by a platform owner. Directory services 236 may be organized such that services can be indexed and sorted to allow a system user to easily find and access a specific service. For example, services may be organized into;directories by subject, such that sports related services may be included in a sports directory. End-users may customize each directory to their needs by, for example, moving frequently used services to the top of a directory.

In response to a user initiating execution of a service by, for example, clicking on a service link provided via the web interface, the Service Execution Environment 240 (SEE) loads the data related to a service from the database 232, and then executes it. The SEE 240 controls the overall program flow, security, privacy, and variables of the service, while each building block 220 handles the execution of its internal logic. Additional details on SEE 240 are described relative to SEE 444, with the description of FIG. 6.

During the creation and execution of a service, the service can interact with external data. The Data Processing System 246 (DPS) includes logic to interface with various external data sources, to filter incoming and outgoing data, and to buffer data which is fed into the platform 200. The interface to the external data is a program that reads, stores and analyzes the data in the format in which the data arrives at platform 200. The data may be in the form of, for example, ASCII, XML, or streaming audio, etc. When a service specifies an action to be performed with, or from, external data, DPS 246 examines the external data, and using stored information indicating acceptable use of the information, filters the data that is not used and stores, updates, or triggers events (as appropriate) from the data that is used.

Middleware layer 250 provides support functionality, such as high availability, coupling to back office, libraries, etc., to applications. For example, MatrixCORE™, which provides both active functionality, such as, interaction with databases from different vendors, handling data logging, managing failures in the platform, etc., and passive functionality in the form of libraries with generic functions, may be used as middleware layer 250. Applications interface to the middleware layer 250 via, for example, software libraries and Application Program Interfaces (APIs). The applications are programmatically linked to the software libraries and use the APis provided by those libraries to access the functionality provided by middleware layer 250.

Back office 254 manages the platform 200 and handles its interface with legacy systems, such as billing and user databases, etc. A legacy system is a system that already exists and exchanges data with platform 200. Back office 254 provides the interfaces needed to successfully integrate with a platform owner's legacy systems, and provides the tools needed to commercially manage the platform 200 (user provisioning, marketing tools, statistics, advertising, hardware & software management, logging, etc.). Back office 254 supports a set of flexible APIs, implemented in a software library, which are called by the back office 254 to interface with the legacy systems. The system further includes a software library that supports the API and also interfaces to the legacy system. The software library is modular in that the modules that interface the legacy systems can be removed and replaced without affecting the back office 254 implementation.

The platform 200 delivers the user-created services to target devices in a format the devices may understand by using a standard protocol, such as, Wireless Application Protocol (WAP).

Figure 4:
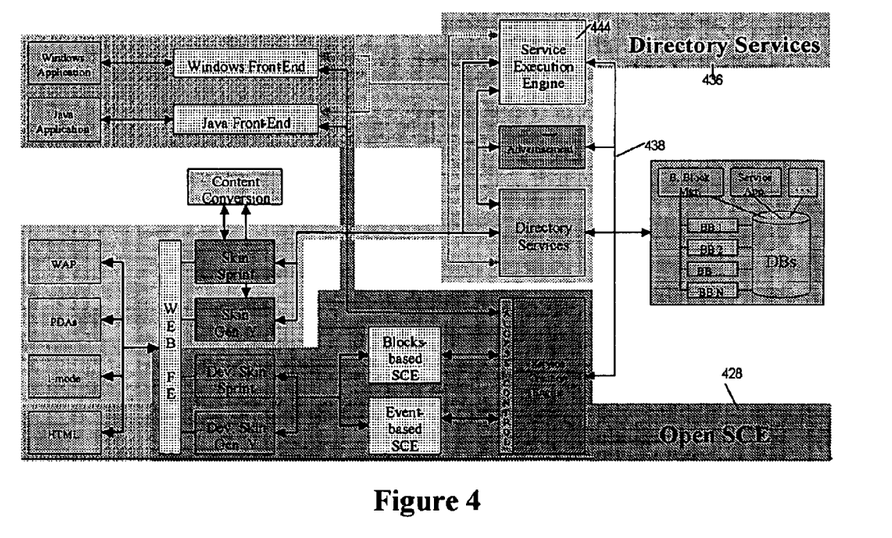
FIG. 4 provides further details on the Directory Services and the OpenSCE, depicted in FIG. 2.

FIG. 4 provides further details on Directory Services 436 and OpenSCE 428. Many devices, including Wireless Application Protocol (WAP) cell phones, PDAs, I-mode cell phones, and HTML enabled devices such as PCs, WebTVs, and Internet appliances access the platform 200 using a markup language and HTTP. All of these devices are connected to a Web Front-End (Web FE) of platform 200. The Web FE handles authentication, session management, and selection of a specific "skin" which provides a unique user interface, look, and feel to the platform. A skin, in general, uses the existing functionality of the underlying interface without extending it. Skins may, however, be used to customize the user interface of platform 200 for different customers (e.g. Sprint PCS, AT&T Wireless, etc.), and for different end-user groups (e.g., Teenagers, Star Trek fans, employees of a company, etc.). The skins used by the platform are "intelligent skins" which can extend and modify the existing functionality of the underlying interface. "Developer skins" provide the user interface to the OpenSCE. An end-user may choose a Star Trek skin while using services, but an Advanced Generation Y Developer Skin when creating new services.

A building block instance refers to a copy of a building block, which is specifically configured to run in a particular service. OpenSCE also handles creation of each building block instance, and linking, deleting, moving, etc. of instances of a building block or a group of building blocks. The OpenSCE 428 interfaces directly with Directory Services 436 to store the service flow data and context data, and indirectly through the building blocks to store the instance data for each building block used in a service. Service flow data reflects the logical flow of the service, including the building blocks that make up the service and the links between the building blocks that define the execution logic of the service. The context data defines to whom and how a service is made available.

Figure 5:
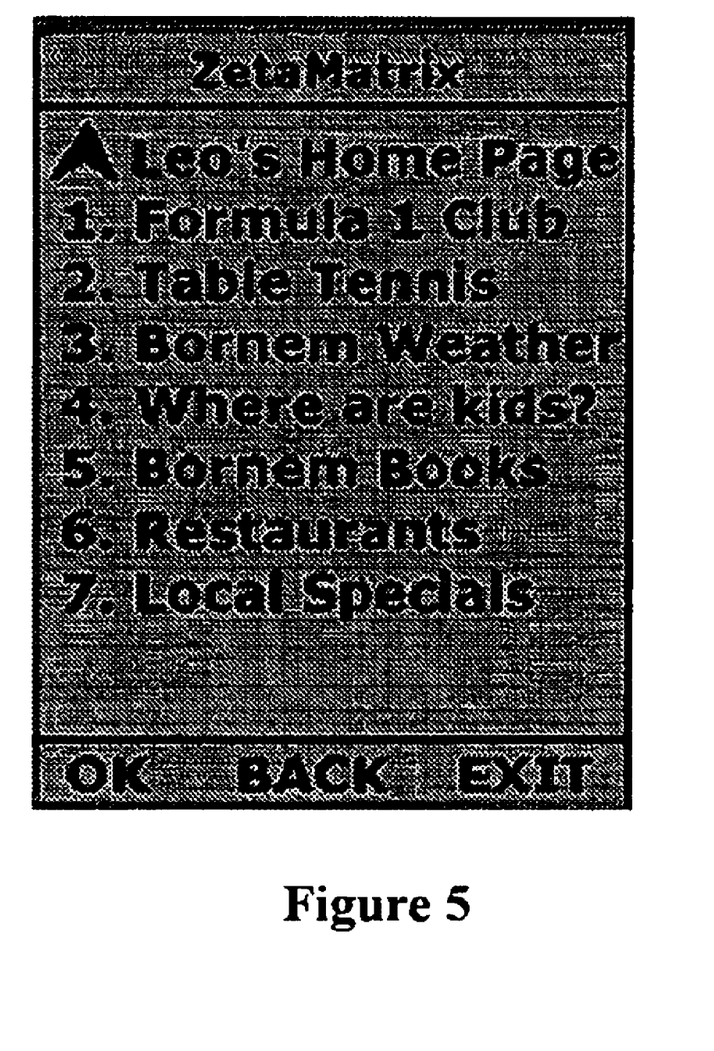
FIG. 5 depicts a screen shot of an exemplary directory listing.

After a service has been created, system-users may be able to view it in their service directory, depending on the accesses assigned to the service by the creator of the service. When a user places a request to Directory Services 436 to retrieve a directory of services, Directory Services 436 loads the corresponding directory from the database, filters the entries included in the directory, and removes all services that the end-user does not have access to. Directory Services 436 then sorts the directory according to, for example, the end-user's user profile settings and modifies the directory to reflect the changes that the end-user has indicated, such as, for example, moving often used entries to the top. Then, Advertisement System 438 modifies the directory to, for example, move advertised services to the top of the listing. Directory Services 436 returns the directory to the skin that requested it. The skin which requested the directory is responsible for displaying the directory to the end-user. FIG. 5 depicts a screen shot of an exemplary directory listing.

When a user selects a service that is displayed in a directory, Service Execution Engine (SEE) 444 loads from Databases 232 data describing the service, and executes the service in the corresponding node, as described above. Prior to executing a service, SEE 444 may request Advertisement System 438 to display an advertisement. Advertisement system 438 determines whether to actually display an advertisement, and which advertisement to display, described further below relative to FIG. 7.

Service Execution Engine

Figure 6:
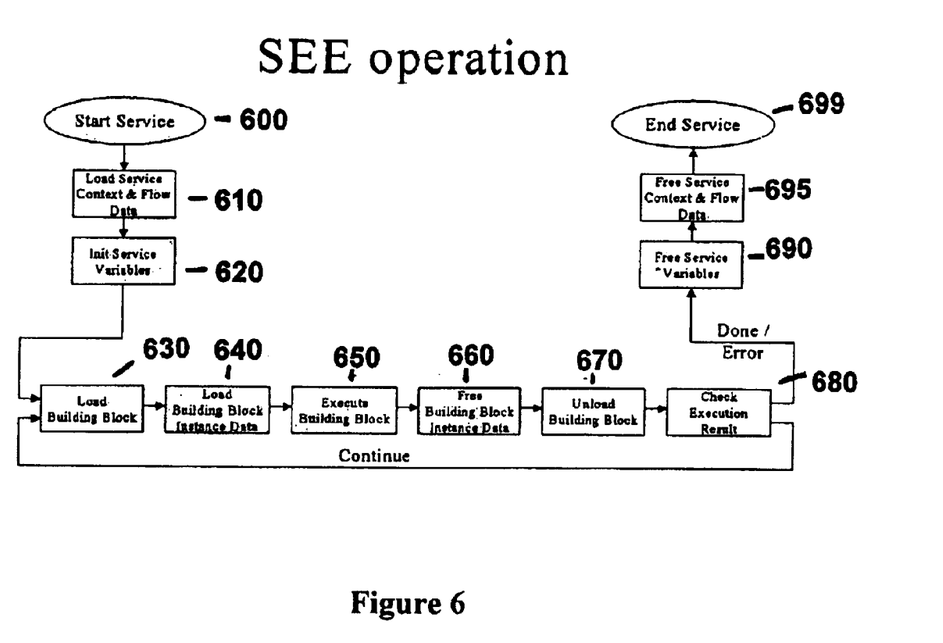
FIG. 6 depicts additional details of the SEE.

FIG. 6 depicts additional details of the Service Execution Engine (SEE) 444. SEE 444 loads from a database a "service context" for a service to be executed. The service context includes generic data about the service, for example, to whom the service is available, where it is available, etc. If the service context includes information indicating, for example, that the specific user requesting execution of the service isn't allowed to execute it, SEE 444 returns an error message. If, on the other hand, the user is allowed to execute the service, SEE 444 loads a data map indicating how the building blocks of the service are linked. Based on this "map," the building blocks are executed according to the specified order. The execution order may be affected by the building blocks, for example, when a conditional event determines what part of the service to execute.

The execution of each building block includes several steps: (1) the building block is loaded into memory, and initialized; (2) the building block loads its instance data from a database, i.e., to load the variables that are configured for the building block; (3) the building block executes using the available instance data; (4) the building block frees the instance data by removing any locks or protection placed on that data during execution of the building block and (5) the building block is released from memory. When the building block is released from memory, the memory resources used by the building block are freed and available for other computing processes to use. These steps need not be performed each time a building block is executed because the system further utilizes various optimization algorithms to increase the execution speed. For example, a building block may only be released from memory after sitting idle for a specified time, allowing a building block which is used twice in one service to remain in memory until the service completes execution.

Execution of a service may also be suspended by saving the execution state of the service in the database. The execution state includes the value of the variables in use by the service and the place in the service execution logic where the service was suspended. After the service execution state is stored in the database, execution of the service is terminated. When execution of the service resumes, the data is retrieved, the variable and the execution state are restored to their pre-suspension state, and the service is restarted from the suspension point. Service suspension may be used, for example, when a user has to fill out a form. After the form is sent to the user, the service execution may be suspended. When the user submits the completed form, the execution is resumed. After a service completes execution, the data associated with the service is discarded.

Once a service executes, it may provide output in the form of device-independent content data to a target device. The platform farther includes a delivery back-end that converts the device independent output data of a service into a format suitable for a target device, using, for example, Wireless Application Protocol (WAP) standards. The platform 200 further includes Content Conversion 450 to convert content from an internal device-independent format to the final output format.

Windows and Java applications

In order to speed up service creation and use, a dedicated Windows or Java application 460 and 464, respectively, may be used to access the platform 200. Such an application connects to the system via a dedicated front-end which handles security and conversion from the application protocol to the existing functions that support service creation, e.g., Directory Services and OpenSCE.

Service Activation

Service activation is the process of making a new service available for execution by one or more end-users. When the service activation process is successful, the new service is made available through a service directory that is included in Directory Services 436. This process may include various steps, depending on the configuration of the platform, the access rights of the service creator, etc. Following is an exemplary service activation process:

1. The service creator requests activation of the service by selecting a "make service available" option from the OpenSCE user interface.
2. The OpenSCE performs integrity checking on the service, including:
    a. Determining whether each of the building blocks is configured correctly/completely. Each building block indicates this itself by ensuring that all configurable values required by the building block are initialized and contain valid values.
    b. Determining whether there at least two building blocks included in the service.
    c. Determining whether each branch of the service has a valid ending block.
    d. Determining whether there are any end-less loops or overly CPU-intensive aspects of the service.
    e. Determining whether the service send large amounts of data to a third party.
    f. Determining whether the service contains adult content, and if so, whether it is listed as an adult service.
3. Verifying that the service creator is allowed to activate services he/she has created, and if not, send an activation request email to the platform administrator.
4. Determining whether the service creator needs to pay for this service, and if so, handling billing for it. If billing fails, service activation is aborted.
5. Reseting the service tracking data so that service misbehavior can be detected at run-time.
6. Informing each building block (instance) that its service has been activated. This allows each building block to initialize external data that it may need to function correctly.
7. Storing the service activation state in the service directory, so that the service can be executed.

Figure 7:
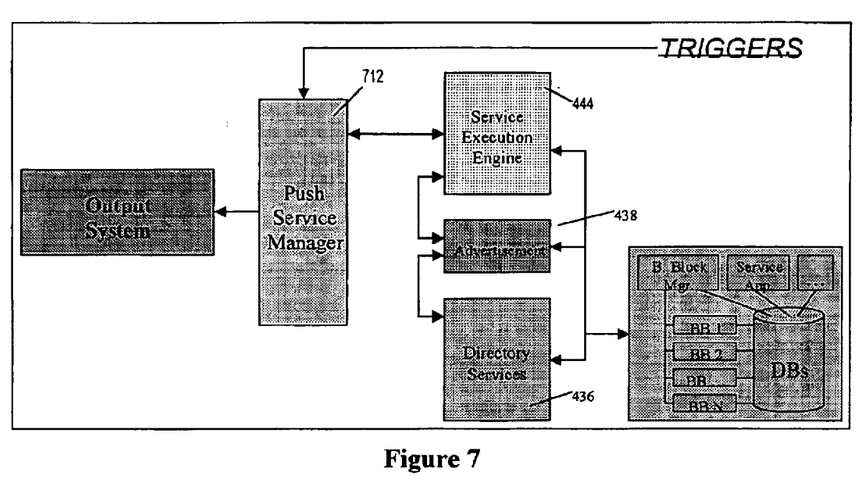
FIG. 7 depicts an example of a processing performed relative to a "push" service.

When a user initiates execution of a service, as described above, the service is referred to as a "pull" service. FIG. 7 depicts the logical components of a "push" service. A push service may be, for example, an advertisement which is sent to the end-user without the user requesting it, a reminder that the user activated earlier, a new stock quote, a "Happy birthday" message from a friend, etc. A "trigger" is an event which initiates execution of the push service. The trigger may come from a variety of sources including, for example, a timer, incoming data, or another service that is executing. Triggers are sent to the Push Service Manager 712, which sends it to a SEE 444 that will execute the service and deliver the output to the appropriate end-user(s). Which SEE 444 is used is determined by a HTTP-based load-balancing system. For interactive services, an intermediate information request is pushed to a user. By replying to pushed information, the user initiates a "pull", and the processing described above (relative to FIG. 4) applies.

The SEE 444 may interact with Advertisement system 438 to display advertisements, either before or during the process of data being sent to a user. Advertisement System 438 requests from Directory Services 436 available advertisements. Advertisement System 438 may either select a specific advertisement based on, for example, matching the ad with user profile information, or may randomly select an ad included in a directory. The selection of advertising is managed by the product owner, using an advertisement management software tool, provided with the product. This tool permits the product owner to select, manage, configure, and track advertising activity in the product.

Figure 8:
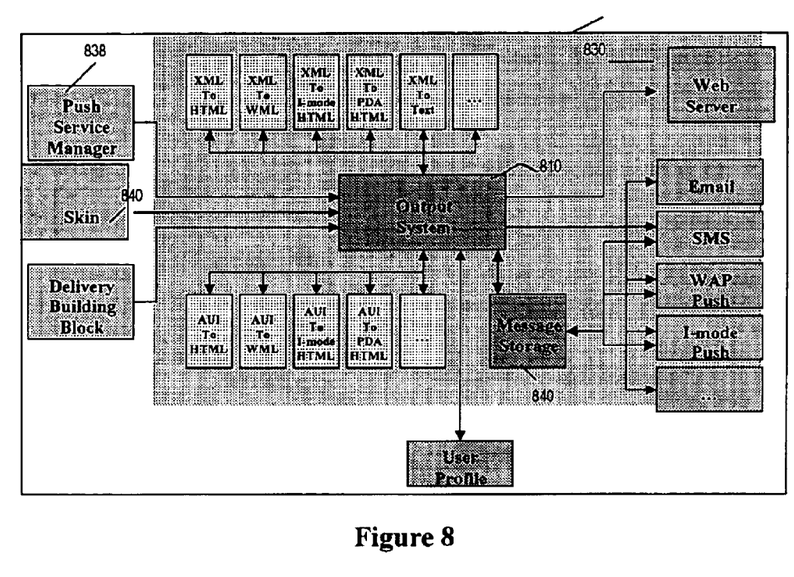
FIG. 8 provides further details on the Output System, depicted in FIG. 2.

FIG. 8 depicts Output System 810. When used in pull mode, a skin 820 passes output data, i.e., data which is output from a service, to Output System 810, which converts the data into a format appropriate for the user, and passes the converted data to the user via web server 830. In push mode, Push Service Manager 838 passes the output of a service to Output System 810 which processes the data as follows: (1) it retrieves the preferred target device from the User Profile (a user may have multiple wireless devices); (2) it performs content conversion, dependent on the target device; (3) the resulting data (device dependent) is passed on to the appropriate delivery system, which usually is also device dependent (SMS, Email, WAP Push, etc.); (4) if the end-user cannot be contacted because, for example, if the end-user has declined message delivery during a specified time, the message may be stored in the Message Store 840 for later delivery.

Figure 9:
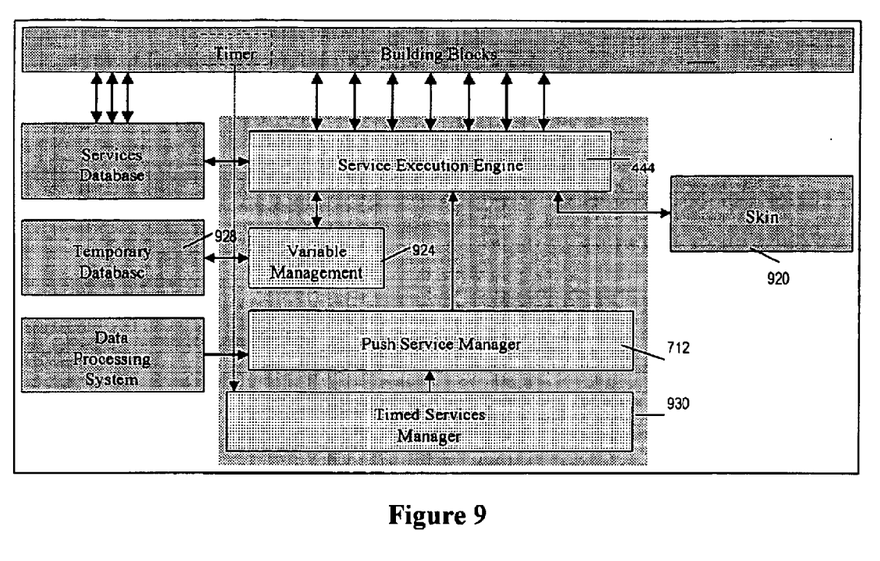
FIG. 9 provides further details on Service Execution Environment, depicted in FIG. 2.

FIG. 9 provides further details on Service Execution Engine 444. Service Execution Engine 444 may be started from a skin 920, or from the Push Service Manager 712. The Service Execution Engine 444 retrieves data related to a service, including service context data and building blocks linking data from the Services Database, i.e., Directory Services 436. When executing a service, the Service Execution Engine 444 interacts with Variable Management 924 (VM) which stores variables which have been defined in a service. Although not depicted in this figure, building blocks 220 may also interact with the VM 924.

VM 924 further includes integrity checking mechanisms. For each variable that VM 924 manages, the VM 924 tracks who has access to the data included in the variable. When a new variable is created using data from an existing variable, the new variable is assigned at least the same privacy settings as the existing variable. VM 924 also verifies that output data is in an appropriate form prior to the data being delivered to an end-user of a service. The VM 924 makes this determination based on information provided by each building block indicating acceptable data types for variables.

The VM 924 also stores variables and retrieves variables from Temporary Database 928 which stores the Session data, which includes the value of the variables used by the service and an indication of a place in the service execution logic where the service was suspended. A service may suspended and subsequently resumed when, for example, a user must complete a form during service execution. The service may be suspended while the user completes the form, and resumed after the user submits the completed form.

The Push Service Manager 712 may receive triggers indicating that data needs to be sent to an end-user from Timed Services Manager 930 and the Data Processing System (DPS) 246. The Timed Services Manager 930 tracks timed services implemented on the platform 200, and sends triggers to activate each of these services. Each timed service includes a timer building block. When a timed service is activated, the timer building block contacts the Timed Services Manager 930 and passes to it data reflecting the specified time of day, day of the week, etc., needed to create a service execution trigger, in this case also known as a timer event.

Figure 10:
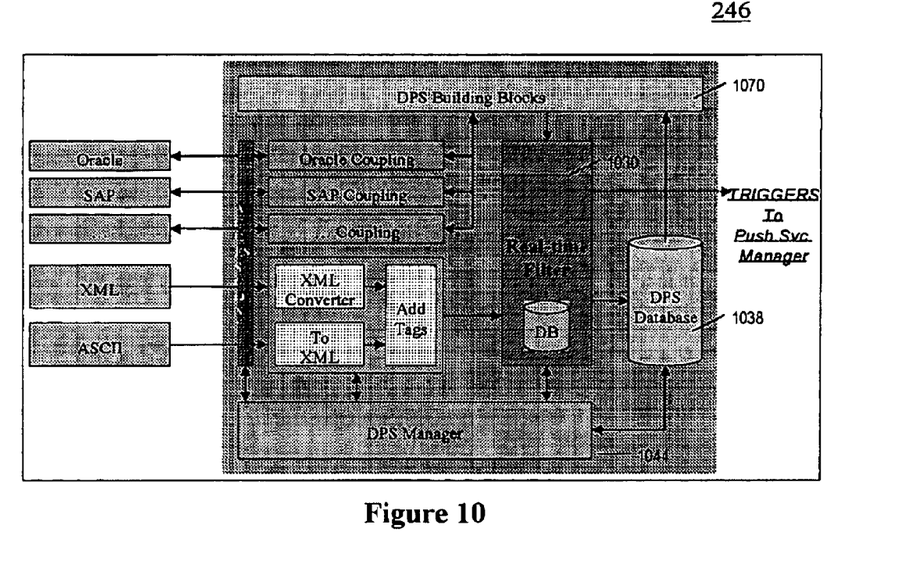
FIG. 10 provides further details on the Data Processing System, depicted in FIG. 2.

FIG. 10 provides further details on DPS 246. The DPS 246 interfaces with external data sources which may be used within services built on platform 200. It interfaces legacy systems such as, for example, Oracle databases, and PeopleSoft, so that those systems can be used from within services created on platform 200. It also converts and stores various data which is fed into a service from a variety of external sources. DPS 246 may process, for example, XML and ASCII based data feeds including, for example, a Reuters™ news feed, a Bloomberg™ sports feed, a NAS-DAQ™ stock exchange data feed, mailing lists, Web pages, word processing files, and MP3 streaming audio and video.

All data feeds (whether unidirectional or bi-directional) can be accessed and/or controlled from one or more building blocks, DPS Building Blocks 1070 (DPSBB). The DPSBBs 1070 control what data leaves the platform, what transactions are performed on legacy systems, for example, an Oracle database. They also control the operation of the Real-time Filter 1030 which creates triggers for incoming data and stores a portion of the incoming data in the DPS Database 1038. In general, only data that is actually used in services is stored in DPS database 1038. Real-time Filter 1030 further includes its own high-speed internal database which stores filtering rules that it receives from DPSBBs 1070, enabling real-time operation.

The DPS Manager 1044 controls the interaction between the external data feeds, DPSBBs, and the DPS Database. It decides which external data feeds are allowed to connect to the platform 200, how those data feeds should be processed, what information will be made available to the DPSBBs 1070, and what information can be stored in the DPS Database 1038.

As described above, the platform 200 takes steps to confirm the integrity of services Cl created with it. If the system fails, a "self-healing" system will detect it and deactivate the appropriate building block(s) by removing it from the database so that it cannot be used in service creation and can no longer be executed as part of a service. The platform restricts the order in which the building blocks are linked, e.g., by ensuring that a service with an invalid building block ordering cannot be activated. Further, the platform may not be accessed through an interface other than the web front-end or the protocol for dedicated applications, absent the explicit permission of the platform owner. Individual building blocks may additionally have error checking parameters which the system reviews prior to activation of a service. Therefore, platform owners do not need to test services created with the platform.

Although the methods and systems of this invention have been described with reference to a specific implementation, those skilled in the art will know of various changes in form and detail which may be made without departing from the spirit and scope of the invention. The scope of the invention is therefore defined only by the appended claims and the full scope of their equivalents.

What is claimed is:

1. A system for an end-user of a service for a device using a platform to create the service, comprising:
    a server;
    a platform residing on the server having a service creation interface to allow the end-user to create the service by linking a first pre-defined building block to a second pre-defined building block, the service being executed without requiring any testing;
    a service execution environment for controlling at least program flow, security settings, privacy settings, and variables of the service;
    a database for storing data related to a service and for providing data to the service execution environment;
    a data processing system for examining at least external data and for determining whether the use of data within a service is acceptable;
    a variable management module for at least checking the integrity of data delivered to the end-user of a service at run-time; and
    a client comprising an interface for interacting with the service creation interface, wherein the platform include rules for checking an integrity of the created service on a platform operated by a party other than the party that created the service.

2. The system of claim 1, wherein the client interacts with the platform via a proxy server protocol.

3. The system of claim 1, further comprising a directory device which stores the first and second pre-defined building blocks.

4. The system of claim 1, further comprising a directory device which stores the service.

5. The system of claim 1, wherein the service creation interface prevents unauthorized users from accessing the service system.

6. The system of claim 1, wherein the device includes an Internet appliance.

7. The system of claim 1, wherein the client interface includes a dedicated client application.

8. The system of claim 1, wherein the first or second building block includes a variable to which an end user assigns a value.

9. The system of claim 1, wherein the first and second building block includes a building block configuration interface which guides the end-user through a process for configuring the building block.

10. The system of claim 1, wherein the client interface includes a web browser.

11. The system of claim 1, wherein the client interface includes a web browser having an intelligent skin.

12. The system of claim 1, wherein the device includes a mobile device.

13. The system of claim 1, wherein the created service is delivered to the device via a wireless application protocol.

14. The system of claim 1, wherein the platform allows a user to configure the first or second building block.

15. A method for an end-user of a service to create the service for a device using a platform owned by a platform owner, the method comprising:
    receiving from the end-user configuration information to configure the first pre-defined defined building block;
    receiving from the end-user linking information indicating a second pre-defined building block to link to a first pre-defined building block;
    creating the service based on the received configuration and linking information;
    creating the service by linking and configuring the first and second pre-defined building blocks;
    loading data relating to a service into a service execution environment from a database, the service execution environment comprising security settings and privacy settings;
    determining an integrity of the created service;
    determining whether the use of the data is of an acceptable type;
    determining at run-time by the service execution environment whether the use of the data by the service is permitted by the security settings and privacy settings; and
    executing the service immediately, on a platform operated by a party other than the party that created the service, without the party operating the platform testing the service.

16. The method of claim 15, further comprising receiving from the end-user an indication of information to modify the service.

17. The method of claim 15, further comprising receiving from the end-user an indication of information to delete the service.

18. The method of claim 15, further comprising receiving from the end-user an indication of information to activate the service.

19. The method of claim 15, further comprising assigning a value to a variable of the first or second building block.

20. The method of claim 15, further comprising executing the service.

* * * * *